United States Patent
Cai et al.

(10) Patent No.: US 8,855,718 B2
(45) Date of Patent: Oct. 7, 2014

(54) SIGNAL TRANSMISSION METHOD, APPARATUS, AND BASE STATION

(71) Applicant: Huawei Technologies Co., Ltd., Guangdong (CN)

(72) Inventors: Rui Cai, Shanghai (CN); Jiang Li, Shanghai (CN); Jinlin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 13/745,183

(22) Filed: Jan. 18, 2013

(65) Prior Publication Data

US 2013/0130703 A1 May 23, 2013

Related U.S. Application Data

(63) Continuation of application No. PCT/CN2011/074746, filed on May 27, 2011.

(30) Foreign Application Priority Data

Jul. 19, 2010 (CN) .......................... 2010 1 0233062

(51) Int. Cl.
  *H04M 1/00* (2006.01)
  *H04B 7/06* (2006.01)
  *H04W 16/24* (2009.01)
  *H04B 7/04* (2006.01)
  *H04W 72/04* (2009.01)

(52) U.S. Cl.
  CPC ................. *H04W 16/24* (2013.01); *H04B 7/06* (2013.01); *H04B 7/0491* (2013.01); *H04B 7/0413* (2013.01); *H04W 72/046* (2013.01)
  USPC .......................... 455/561; 455/562.1; 455/447

(58) Field of Classification Search
  CPC ..... H04W 16/14; H04W 16/02; H04W 16/04; H04W 16/06; H04W 16/08; H04W 16/10; H04W 16/12; H04W 16/24; H04W 16/32; H04W 72/0486; H04W 72/0493; H04W 72/0413; H04W 72/0412
  USPC .............. 455/422.1, 446, 447, 448, 449, 450, 455/452.1, 561, 562.1
  See application file for complete search history.

(56) References Cited

U.S. PATENT DOCUMENTS 6,212,385 B1   4/2001   Thomas et al.
8,509,792 B1 *   8/2013   Oroskar et al. ............... 455/450

(Continued)

FOREIGN PATENT DOCUMENTS

CN   101160746 A   4/2008
CN   101395820 A   3/2009

(Continued)

OTHER PUBLICATIONS

Extended European Search Report in corresponding European Patent Application No. 11789143.2 (Mar. 13, 2013).

(Continued)

*Primary Examiner* — Temica M Beamer
(74) *Attorney, Agent, or Firm* — Leydig, Voit & Mayer, Ltd.

(57) ABSTRACT

Embodiments of the present invention provide a signal transmission method, apparatus, and base station. The method includes: sending downlink signals through N sectors, where the N sectors are created by using M sectors used to receive uplink signals, and N>M. In the embodiments of the present invention, the base station creates N sectors by using M sectors used to receive uplink signals and sends downlink signals through the N sectors, so that the multi-sector technology is mainly used in the downlink and the multi-antenna technology is mainly used in the uplink. This may resolve an existing conflict between the uplink and the downlink when system capacity is being improved, thereby improving system capacity of a wireless communication network.

18 Claims, 2 Drawing Sheets

(56) References Cited

U.S. PATENT DOCUMENTS

| | | |
|---|---|---|
| 2006/0234777 A1 | 10/2006 | Vannithamby et al. |
| 2007/0049218 A1 | 3/2007 | Gorokhov et al. |
| 2007/0135170 A1 | 6/2007 | Khan et al. |
| 2007/0202809 A1 | 8/2007 | Lastinger et al. |
| 2010/0296477 A1* | 11/2010 | Hason et al. .................. 370/330 |

FOREIGN PATENT DOCUMENTS

| | | | |
|---|---|---|---|
| CN | 101472287 | A | 7/2009 |
| CN | 101908915 | A | 12/2010 |
| EP | 1898542 | A1 | 3/2008 |

OTHER PUBLICATIONS

1st Office Action in corresponding Chinese Patent Application No. 201010233062.9 (Jun. 4, 2012).

Written Opinion of the International Searching Authority in corresponding PCT Patent Application No. PCT/CN2011/074746 (Sep. 8, 2011).

International Search Report in corresponding PCT Patent Application No. PCT/CN2011/074746 (Sep. 8, 2011).

* cited by examiner

SIGNAL TRANSMISSION METHOD, APPARATUS, AND BASE STATION

CROSS-REFERENCE TO RELATED APPLICATIONS

This application is a continuation of International Patent Application No. PCT/CN2011/074746, filed on May 27, 2011, which claims priority to Chinese Patent Application No. 201010233062.9, filed on Jul. 19, 2010, both of which are hereby incorporated by reference in their entireties.

FIELD OF THE INVENTION

The present invention relates to the field of wireless communications technologies, and in particular to a signal transmission method, apparatus, and base station.

BACKGROUND OF THE INVENTION

A wireless communication system generally includes a base station and a user equipment (User Equipment, hereinafter referred to as UE for short). The base station and the UE communicate with each other through electromagnetic waves transmitted and received by a wireless transceiver. A signal sent by the base station to the UE is referred to as a downlink (downlink, DL for short) signal. A signal sent by the UE to the base station is referred to as an uplink (uplink, UL for short) signal. Each wireless transceiver has particular coverage. One base station may communicate with multiple UEs in its coverage. Generally, the coverage of a base station is referred to as a cell. The total traffic supported by a cell is referred to as cell capacity. Multiple base stations may be correlated with each other according to a particular rule to form a wireless communication network with larger coverage. The sum of cell capacity of each cell included in the wireless communication network is system capacity of the wireless communication network.

An existing networking solution for improving system capacity is combining the multi-sector method with the multi-antenna method. The multi-sector method is dividing a cell into multiple physical sectors and improving frequency reusability by using multiple sectors, thereby improving system capacity. The multi-antenna method is performing communication by using the MIMO (Multiple Input Multiple Output, multiple input multiple output) technology to improve system capacity. Under the condition that the total number of antennas in a base station remains unchanged, a larger number of sectors corresponding to the base station results in a smaller number of antennas of each sector. In this case, frequency reusability brought by the number of sectors is higher, and an MIMO gain brought by the number of antennas is lower. A smaller number of sectors corresponding to the base station results in a larger number of antennas of each sector. In this case, frequency reusability brought by the number of sectors is lower, and an MIMO gain brought by the number of antennas is higher.

The inventor of the present invention finds that: in a frequency division duplex (Frequency Division Duplex, FDD for short) system, under the condition that the total number of antennas is the same, for downlink communication, a system capacity gain brought by frequency reuse is higher than that brought by the MIMO gain, whereas for uplink communication, the system capacity gain brought by frequency reuse is lower than that brought by the MIMO gain. That is, under the condition that the total number of antennas is the same, the system capacity gain is higher when more sectors are used in the downlink, whereas the system capacity gain is higher when fewer sectors are used in the uplink. As may be seen from the above, in the prior art, a conflict exists between uplink and downlink processing for improving system capacity.

SUMMARY OF THE INVENTION

Embodiments of the present invention provides a signal transmission method, apparatus, and base station to resolve an existing conflict between uplink and downlink processing, so as to improve system capacity of a wireless communication network.

According to one aspect, a signal transmission method is provided, including:

sending downlink signals through N sectors; where the N sectors are created by M sectors used to receive uplink signals, and N>M.

According to another aspect, a signal transmission apparatus is provided, including:

a creation module, configured to create N sectors by using M sectors used to receive uplink signals, where N>M; and a sending module, configured to send uplink signals through the N sectors.

According to another aspect, a base station is provided, including any signal transmission apparatus provided in the embodiment of the present invention.

According to the signal transmission method, apparatus, and base station in the embodiments of the present invention, the base station creates N sectors by using M sectors used to receive uplink signals (N is greater than M) and sends downlink signals through the N sectors, so that the multi-sector technology is mainly used in the downlink and the multi-antenna technology is mainly used in the uplink. This resolves an existing conflict between the uplink and the downlink when system capacity is being improved, and improves system capacity of the wireless communication network.

DETAILED DESCRIPTION OF THE EMBODIMENTS

To make the objectives, technical solutions, and advantages of the present invention more comprehensible, the following further describes the present invention in detail with reference to embodiments and the accompanying drawings.

Figure 1:
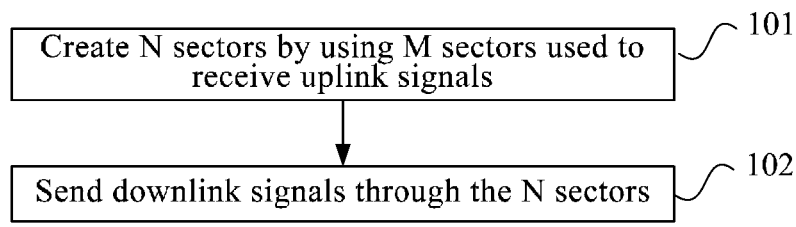
FIG. 1 is a flowchart of a signal transmission method according to an embodiment of the present invention.

FIG. 1 is a flowchart of a signal transmission method according to an embodiment of the present invention. As shown in FIG. 1, the method includes:

Step 101: Create N sectors by using M sectors used to receive uplink signals, where N is greater than M.

The M sectors used to receive uplink signals in this embodiment may be virtual sectors, physical sectors, or a combination of virtual sectors and physical sectors. The N created sectors may be virtual sectors or a combination of virtual sectors and physical sectors. That the M sectors used to receive uplink signals are all physical sectors is taken as an example for description in the following.

Multiple directional antennas exist in a base station. A cell corresponding to the base station is divided into one or more physical sectors by these directional antennas, that is, divided into M physical sectors. The number of sectors into which the cell is divided is not limited in this embodiment. For example, the cell may be divided into one or three physical sectors. Each physical sector includes n antennas, where n≥2. Directions of the n antennas in each physical sector are the same, whereas directions of antennas in different physical sectors are different. A physical sector is a sector into which a cell is divided in terms of hardware by using a traditional sector directional antenna.

When a cell covered by the base station is divided into M physical sectors, the base station may create multiple virtual sectors by using each physical sector, which forms N sectors in total. The N sectors are all virtual sectors. The base station may also create multiple virtual sectors by using each physical sector among any one or more physical sectors, which forms N sectors in total. In this case, the N sectors may include the created virtual sectors and a physical sector which is not used to create a virtual sector.

The process of creating multiple virtual sectors by using one physical sector may include: using the physical sector to form multiple beams by weighting common pilots of the physical sector, where each beam points at a smaller sector, thereby forming multiple virtual sectors. Directions of the multiple virtual sectors are different.

When at least one group of virtual sectors that correspond to the same physical sector exists in the M sectors used to receive uplink signals, by using the preceding method, more virtual sectors may be created by using the physical sector that corresponds to the at least one group of virtual sectors.

For the uplink, the base station may use the M sectors to receive uplink signals, which may specifically be as follows: the base station centrally schedules users included in each sector among the M sectors and then receives uplink signals through physical antennas of the M sectors.

Step 102: Send downlink signals through the N sectors.

The base station sends downlink signals through the N sectors created in step 101.

This embodiment may be applied to an FDD system. In the FDD system, under the condition that the total number of antennas remains unchanged, a multi-sector capacity gain is higher than a multi-antenna capacity gain in the downlink, whereas a multi-antenna capacity gain is higher than a multi-sector capacity gain in the uplink. In this embodiment, a cell corresponding to a base station is divided into fewer sectors in the uplink. That is, the multi-antenna technology is used in the uplink to increase uplink system capacity. An original sector is divided into more sectors in the downlink That is, the multi-sector technology is used in the downlink to increase downlink system capacity.

The multi-antenna technology is acquiring, through joint reception and transmission between multiple antennas, a diversity gain, an array gain, and space reuse that are brought by multi-antenna processing, and is capable of efficiently improving the level of the average signal to noise ratio of received signals and resisting wireless channel fading, thereby achieving the objective of improving wireless system capacity and coverage. The multi-sector technology is dividing one cell into multiple sectors so that the cell receives interference of only a part of cells among intra-frequency cells, which may reduce intra-frequency interference and improve frequency reusability.

According to the signal transmission method in this embodiment of the present invention, more sectors are used to send downlink signals and fewer sectors are used to receive uplink signals. That is, the multi-sector technology is mainly used in the downlink and the multi-antenna technology is mainly used in the uplink. This may resolve an existing conflict between the uplink and the downlink when system capacity is being improved, thereby improving coverage and system capacity of a wireless communication network.

Figure 2:
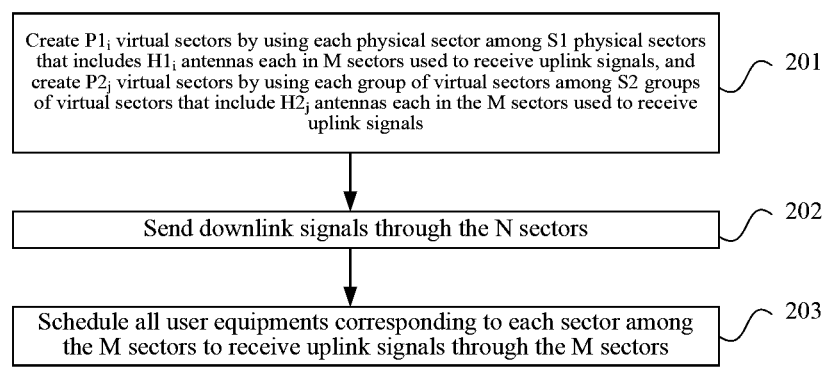
FIG. 2 is a flowchart of a signal transmission method according to another embodiment of the present invention.

FIG. 2 is a flowchart of a signal transmission method according to another embodiment of the present invention. As shown in FIG. 2, the method includes:

Step 201: Create $P1_i$ virtual sectors by using each physical sector among S1 physical sectors that includes $H1_i$ antennas wherein S1 physical sectors are in the M sectors, used to receive uplink signals. Create $P2_j$ virtual sectors by using each group of virtual sectors among S2 groups of virtual sectors in the M sectors used to receive uplink signals, where each group of virtual sectors includes $H2_j$ antennas.

The i indicates a serial number of a sector among the S1 sectors, i∈[1,S1], $P1_i$≥2, and $H1_i$≥2. Each group of virtual sectors includes $R_j$ virtual sectors, and $R_j$ virtual sectors in each group of virtual sectors correspond to the same physical sector. The j indicates a serial number of a group of sectors among the S2 groups of sectors, j∈[1,S2], $P2_j$>$R_j$, and $H2_j$≥2;

$$S1 \geq 0, S2 \geq 0, M \geq S1 + \sum_{j=1}^{S2} R_j > 0,$$

$$\text{and } \left(M - S1 - \sum_{j=1}^{S2} R_j\right) + \sum_{i=1}^{S1} P1_i + \sum_{j=1}^{S2} P2_j = N.$$

M sectors used to receive uplink signals in each embodiment of the present invention may be physical sectors or virtual sectors, and may also include physical sectors and virtual sectors.

When the M sectors are all physical sectors, multiple virtual sectors may be created by using each sector among S1 physical sectors in the M physical sectors, and in this case, S2=0. The number of virtual sectors created by using each physical sector may be the same or different.

When the M sectors are all virtual sectors, more virtual sectors may be created by using each group of virtual sectors among S2 groups of virtual sectors in the M virtual sectors, and in this case, S1=0. The number of virtual sectors created by using each group of virtual sectors may be the same or different.

When the M sectors include physical sectors and virtual sectors, multiple virtual sectors may be created by using the physical sectors and the virtual sectors, and in this case, S1≠0 and S2≠0.

A physical sector which is used to create multiple virtual sectors includes at least two antennas.

Common pilot weighting may be performed, by using the MIMO technology, on $H1_i$ antennas in physical sector i that includes $H1_i$ antennas to form $P1_i$ beams pointing at different directions, thereby forming $P1_i$ virtual sectors; common pilot weighting may also be performed, by using the MIMO technology, on $H2_j$ antennas in a physical sector that corresponds to group j of virtual sectors that includes $H2_j$ antennas to form $P2_j$ beams pointing at different directions, thereby forming $P2_j$ virtual sectors.

The following describes in detail the two cases of creating multiple virtual sectors by using a physical sector and creating multiple virtual sectors by using a group of virtual sectors.

In the first case, the process of creating $P1_i$ virtual sectors by using physical sector i may be: classifying the $H1_i$ antennas in physical sector i into at least one group, where each group includes at least two antennas; and weighting each antenna in each group by using $P1_i$ sets of weights to form $P1_i$ beams, where the number of weights included in each set of weights equals the number of antennas in each group, and the $P1_i$ sets of weights are different from each other; the number of sets of weights for weighting each group of antennas equals the number of formed beams, that is, equals the number of formed virtual sectors.

In a specific implementation manner, N may be an integral multiple of M, S1=M, $P1_i$=N/S1, and S2=0. For example, a cell includes three (M=3) physical sectors and the base station creates two virtual sectors by using each physical sector (that is, creates six (N=6) virtual sectors by using the three physical sectors). A specific creation process may be as follows:

A cell corresponding to the base station is divided into three physical sectors in terms of hardware by using traditional sector directional antennas. Each physical sector has multiple antennas, and the unit directivity pattern of each antenna may be 65 degree or wider.

By using the MIMO technology, six virtual sectors may be created by using three physical sectors: classify multiple antennas in each physical sector among the three physical sectors into k groups, where each group forms two beams (that is, a first beam and a second beam; the number of formed beams is the number of formed virtual sectors), each beam points at a smaller sector, the first beam in each group points at the same direction and the second beam in each group also points at the same direction (that is, k first beams point at the same direction to form one virtual sector, and k second beams point at the same direction to form another virtual sector). In this way, two virtual sectors are created by using one physical sector, that is, six virtual sectors are created by using three physical sectors. The process may specifically be as follows: for a Long Term Evolution (Long Term Evolution, LTE for short) system, common pilots of each physical sector may be weighted by using two different sets of weights. The two different sets of weights correspond to two different cell (cell) IDs. And, a common pilot is adopted so that weighted common pilots are staggered in a frequency domain to reduce interference. In this way, two beams are formed, pointing at two different directions and representing two virtual sectors. Different virtual sectors correspond to different weights. The process of obtaining two virtual sectors from each physical sector may be as follows: for example, each physical sector includes six antennas, the six antennas are classified into three groups, and each group has two antennas. Then, each group is used to form two beams. That is, a set of weights a1 and a2 is used to weight common pilots of two antennas in each group to form a beam, and another set of weights a1' and a2' is used to weight common pilots of two antennas in each group to form another beam. That is, two different sets of weights w1 (a1, a2) and w1' (a1', a2') are used to weight common pilots of two antennas in each group to form two beams. In this way, two virtual sectors are obtained from one physical sector.

In the LTE system, the base station is an evolved NodeB (Evolved Node B, eNodeB for short).

In the second case, the process of creating $P2_j$ virtual sectors by using a physical sector that corresponds to group j of virtual sectors may be: classifying $H2_j$ antennas in the physical sector into at least one group, where each group includes at least two antennas; weighting each antenna in each group by using $P2_j$ sets of weights to form $P2_j$ beams, where the number of weights included in each set of weights equals the number of antennas in each group, and the $P2_j$ sets of weights are different from each other. The number of sets of weights for weighting each group of antennas equals the number of formed beams, that is, equals the number of formed virtual sectors. For a more specific creation process, refer to the process of creating multiple virtual sectors by using physical sector i. Details are not repeated here.

Step 202: Send downlink signals through the N sectors.

In step 201, $P1_i$ virtual sectors are created by using each sector among S1 sectors in the M sectors, and $P2_j$ virtual sectors are created by using each group of sectors among S2 groups of sectors in the M sectors. In this way, N sectors are obtained, where $$N = \left(M - S1 - \sum_{j=1}^{S2} R_j\right) + \sum_{i=1}^{S1} P1_i + \sum_{j=1}^{S2} P2_j.$$

That is, the N sectors include a sector which is not used to create a virtual sector and the created virtual sectors. The base station sends downlink signals through the obtained N sectors.

It should be noted that each sector (including a sector before virtual sectors are created and each sector after creation) may have identifier information, for example, a cell ID.

In the process of sending downlink signals by the base station through the N sectors, the base station sends cell IDs of the N sectors to an UE. After receiving the cell IDs delivered by the base station, the UE selects a cell with good signal quality according to quality of received signals to access a network and returns the selected cell ID to the base station. The base station may learn a cell (cell) where the UE is located according to the cell ID and learn how to send data to the UE.

For example, the base station sends downlink data signals to multiple UEs in the coverage of the base station through six virtual sectors. The downlink capacity physically approximates to downlink capacity of six sectors. That is, performance of the six virtual sectors in this embodiment approximates to that of six physical sectors in terms of hardware. However, compared with six physical sectors in terms of hardware, only three physical sectors exist in this embodiment in terms of hardware, which avoids a high cost for installing antennas in six physical sectors and reduces the cost.

Step 203: Schedule user equipments corresponding to each sector among the M sectors to receive uplink signals through the M sectors.

The base station schedules user equipments corresponding to each physical sector among the S1 physical sectors and user equipments corresponding to each virtual sector in the S2 groups of virtual sectors. In addition, the base station performs reception, by using an original normal mode, on other sectors which are not used to create a virtual sector. That is, the base station schedules user equipments corresponding to each sector which is not used to create a virtual sector. In this way, uplink signals are received through the original M sectors.

The scheduling, by the base station, user equipments corresponding to each physical sector among the S1 physical sectors may specifically be as follows: the base station may obtain, according to an identifier (cell ID) of each virtual sector, information about all user equipments included in all virtual sectors that are created by using the same physical sector, then schedule all user equipments in the same physical sector, and use antennas in an original physical sector to receive uplink signals sent by these user equipments.

The scheduling, by the base station, user equipments corresponding to each virtual sector in the S2 groups of virtual sectors may specifically be as follows: the base station obtains, according to an identifier of each virtual sector in the S2 groups of sectors before virtual sectors are created, information about all user equipments included in each virtual sector in the S2 groups of sectors, then schedules all user equipments included in each virtual sector, and uses virtual sectors in the original S2 groups of sectors to receive uplink signals sent by these user equipments. For example, a certain group of sectors among the S2 groups of sectors includes virtual sector 1 (with a Cell ID being ID1) and virtual sector 2 (with a Cell ID being ID2), and virtual sector 1 and virtual sector 2 correspond to the same physical sector A. When sending downlink signals, the base station creates virtual sector 1', virtual sector 2', virtual sector 3', and virtual sector 4' by using physical sector A and uses virtual sector 1', virtual sector 2', virtual sector 3', and virtual sector 4' to send downlink signals. When receiving uplink signals, the base station schedules all users in virtual sector 1 and all users in virtual sector 2, so as to receive uplink signals by using virtual sector 1 and virtual sector 2.

In the example where six virtual sectors are created by using three physical sectors, after six virtual sectors are formed in the downlink, the base station centrally schedules each two virtual sectors corresponding to the same physical sector to form a large sector in the uplink. The number of receive antennas of each large sector is N0. In this way, uplink capacity approximates to uplink capacity of three physical sectors where each physical sector includes N0 antennas. That is, in this embodiment, centralized scheduling and centralized reception are performed in the uplink on two virtual sectors corresponding to the same physical sector to acquire performance that approximates to three physical sectors in terms of hardware, where each sector includes N0 antennas.

A time sequence relationship of step 202 and step 203 is not limited in this embodiment. The two steps correspond to the downlink and the uplink, respectively.

That by using the MIMO technology, six virtual sectors are created by using three physical sectors is taken as an example, in this embodiment, advantages of traditional three sectors and six sectors are combined in terms of performance, so that downlink performance approximates to six sectors and uplink performance approximates to three sectors. This may resolve a conflict between the uplink and the downlink in an existing solution and improve network coverage and system capacity. In addition, in this embodiment, conversion can be flexibly performed between three sectors and six sectors without a need of modifying hardware devices and architecture, thereby reducing the cost.

Further, in this embodiment of the present invention, conversion from fewer sectors to more sectors is implemented in terms of software. In this way, it is convenient to regress from more sectors to fewer sectors. For example, if the downlink MIMO technology has further development so that under the condition that the total number of antennas remains unchanged and performance of three downlink sectors exceeds that of six sectors, the number of downlink sectors may be reduced, that is, reducing the number of six soft sectors (created virtual sectors). The six soft sectors may also be directly regressed to three sectors. When the six soft sectors are directly regressed to three sectors, downlink signals are sent directly by using an original physical sector instead of virtual sectors.

Therefore, the method provided in this embodiment may further include:

The number of N sectors used to send downlink signals are reduced to implement regression from more sectors to fewer sectors. Specifically, the number of P1$_i$ virtual sectors created in step 201 or the number of P2$_j$ virtual sectors created in step 201 may be reduced to reduce the number of N sectors. For example, the number of virtual sectors created by using physical sector i in step 201 may be reduced, or the virtual sectors created by using physical sector i in step 201 may be directly regressed to the original physical sector i. When the number of virtual sectors created by using physical sector i is reduced to 0, it is equivalent to a direct regression from virtual sectors created by using physical sector i to the original physical sector i.

After the number of N sectors used to send downlink signals is reduced, downlink signals are sent by using the reduced sectors.

According to the signal transmission method in this embodiment of the present invention, a base station creates N sectors by using M sectors used to receive uplink signals (N is greater than M), so as to use more sectors to send downlink signals and fewer sectors to receive uplink signals. That is, the multi-sector technology is mainly used in the downlink and the multi-antenna technology is mainly used in the uplink. This may improve uplink and downlink system capacity, thereby improving network coverage and capacity. In addition, in this embodiment, conversion may be performed flexibly between more sectors and fewer sectors, so that sectorization of a base station is more flexible.

Persons skilled in the art may understand that all or part of steps of the methods in the embodiments may be implemented by a computer program instructing relevant hardware. The program may be stored in a computer readable storage medium. When the program is run, the steps of the methods in the embodiment are performed. The above storage medium includes various mediums capable of storing program codes, such as a ROM, a RAM, a magnetic disk, or an optical disk.

Figure 3:
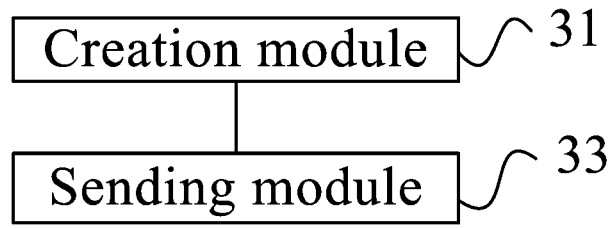
FIG. 3 is a schematic diagram of a signal transmission apparatus according to an embodiment of the present invention.

FIG. 3 is a schematic diagram of a signal transmission apparatus according to an embodiment of the present invention. As shown in FIG. 3, the apparatus includes a creation module 31 and a sending module 33.

The creation module 31 is configured to create N sectors by using M sectors used to receive uplink signals, where N>M. The sending module 33 is configured to send downlink signals through N sectors.

For working processes and working principles of each module in this embodiment, refer to the description in each of the preceding method embodiments. Details are not repeated here.

According to the signal transmission apparatus in this embodiment of the present invention, the sending module uses more sectors to send downlink signals, and fewer sectors are used to receive uplink signals. That is, the multi-sector technology is mainly used in the downlink and the multi-antenna technology is mainly used in the uplink. This may resolve an existing conflict between the uplink and the downlink when system capacity is being improved, thereby improving coverage and system capacity of a wireless communication network.

Figure 4:
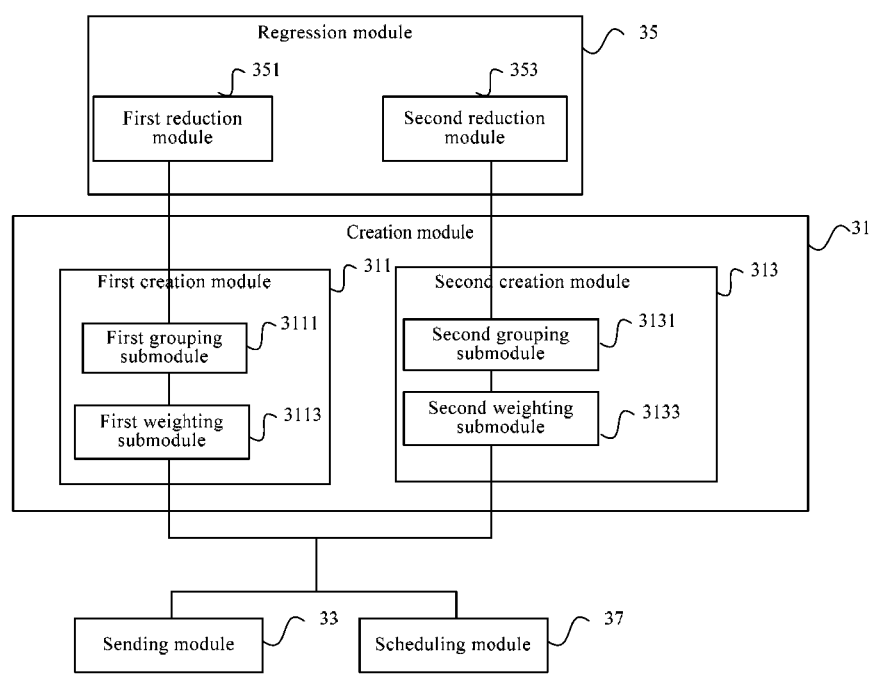
FIG. 4 is a schematic diagram of a signal transmission apparatus according to another embodiment of the present invention.

FIG. 4 is a schematic diagram of a signal transmission apparatus according to another embodiment of the present invention, which is shown in FIG. 4 based on the embodiment shown in FIG. 3.

A creation module 31 includes a first creation module 311 and a second creation module 313. The apparatus may further include a regression module 35 and a scheduling module 37.

The first creation module 311 is configured to create $P1_i$ virtual sectors by using each physical sector among S1 physical sectors that includes $H1_i$ antennas, wherein S1 physical sectors are in the M sectors and i indicates a serial number of a sector among the S1 sectors, $i\in[1,S1]$, $P1_i\geq 2$, and $H1_i\geq 2$. The second creation module 313 is configured to create $P2_j$ virtual sectors by using each group of virtual sectors among S2 groups of virtual sectors in the M sectors, where each group of virtual sectors includes $H2_j$ antennas and $R_j$ virtual sectors, $R_j$ virtual sectors in each group of virtual sectors correspond to the same physical sector, j indicates a serial number of a group of sectors among the S2 groups of sectors, $j\in[1,S2]$, $P2_j>R_j$, and $$H2_j \geq 2\cdot S1 \geq 0, S2 \geq 0, M \geq S1 + \sum_{j=1}^{S2} R_j > 0,$$

$$\text{and } \left(M - S1 - \sum_{j=1}^{S2} R_j\right) + \sum_{i=1}^{S1} P1_i + \sum_{j=1}^{S2} P2_j = N.$$

The first creation module 311 is specifically configured to perform common pilot weighting on $H1_i$ antennas in physical sector i that includes $H1_i$ antennas to form $P1_i$ beams pointing at different directions, thereby forming $P1_i$ virtual sectors. The second creation module 313 is specifically configured to perform common pilot weighting on $H2_j$ antennas in a physical sector that corresponds to group j of virtual sectors that includes $H2_j$ antennas to form $P2_j$ beams pointing at different directions, thereby forming $P2_j$ virtual sectors.

The first creation module 311 includes a first grouping submodule 3111 and a first weighting submodule 3113.

The first grouping submodule 3111 is configured to classify $H1_i$ antennas in a physical sector that includes $H1_i$ antennas into at least one group, where each group includes at least two antennas. The first weighting submodule 3113 is configured to weight each antenna in each group among the at least one group by using $P1_i$ sets of weights to form $P1_i$ beams, where the number of weights included in each set of weights equals the number of antennas in each group.

The second creation module 313 includes a second grouping submodule 3131 and a second weighting submodule 3133.

The second grouping submodule 3131 is configured to classify $H2_j$ antennas in a physical sector that corresponds to virtual sectors and includes $H2_j$ antennas into at least one group, where each group includes at least two antennas. The second weighting submodule 3133 is configured to weight each antenna in each group among the at least one group by using $P2_j$ sets of weights to form $P2_j$ beams, where the number of weights included in each set of weights equals the number of antennas in each group.

The regression module 35 is configured to reduce the number of N sectors used to send downlink signals.

The regression module 35 includes a first reduction module 351 and/or a second reduction module 353.

The first reduction module 351 is configured to reduce the number of $P1_i$ created virtual sectors. The second reduction module 353 is configured to reduce the number of $P2_j$ created virtual sectors.

The scheduling module 37 is configured to schedule user equipments corresponding to each sector among the M sectors to receive uplink signals through the M sectors.

For working processes and working principles of each module and unit in this embodiment, refer to the description in each of the preceding method embodiments. Details are not repeated here.

According to the signal transmission apparatus in this embodiment of the present invention, the sending module uses more sectors to send downlink signals, and fewer sectors are used through the scheduling module to receive uplink signals. That is, the multi-sector technology is mainly used in the downlink and the multi-antenna technology is mainly used in the uplink. This may resolve an existing conflict between the uplink and the downlink when system capacity is being improved, thereby improving coverage and system capacity of a wireless communication network. In addition, in this embodiment, conversion may be performed flexibly between more sectors and fewer sectors, so that sectorization of a base station is more flexible.

An embodiment of the present invention further provides a base station. The base station may include the signal transmission apparatus in the embodiment shown in FIG. 3 or FIG. 4.

For working processes and working principles of each module and unit in this embodiment, refer to the description in each of the preceding method embodiments. Details are not repeated here.

In this embodiment of the present invention, the base station uses more sectors to send downlink signals and fewer sectors to receive uplink signals. That is, the multi-sector technology is mainly used in the downlink and the multi-antenna technology is mainly used in the uplink. This may resolve an existing conflict between the uplink and the downlink when system capacity is being improved, thereby improving coverage and system capacity of a wireless communication network. In addition, in this embodiment, conversion may be performed flexibly between more sectors and fewer sectors, so that sectorization of a base station is more flexible.

Finally, it should be noted that the above embodiments of the present invention are merely intended for describing the technical solutions of the present invention other than limiting the present invention. Although the present invention is described in detail with reference to the foregoing embodiments, persons skilled in the art should understand that they may still make modifications to the technical solution described in the foregoing embodiments or make equivalent substitutions to some technical features thereof, without departing from the spirit and scope of the technical solution of the embodiments of the present invention.

What is claimed is:
1. A signal transmission method, comprising:
sending downlink signals through N sectors, wherein the N sectors are created by M sectors used to receive uplink signals, and wherein N>M;
wherein the N sectors are created in at least one of the following manners by using the M sectors used to receive uplink signals:
creating $P1_i$ virtual sectors by using each physical sector among S1 physical sectors that comprises $H1_i$ antennas, wherein S1 physical sectors are in the M sectors and i indicates a serial number of a sector among the S1 sectors, i∈[1,S1], P1$_i$≥2, and H1$_i$≥2; and creating P2$_j$ virtual sectors by using each group of virtual sectors among S2 groups of virtual sectors in the M sectors, wherein each group of virtual sectors comprises H2$_j$ antennas and R$_j$ virtual sectors, R$_j$ virtual sectors in each group of virtual sectors correspond to the same physical sector, j indicates a serial number of a group of sectors among the S2 groups of sectors, j∈[1,S2], P2$_j$≥R$_j$, and H2$_j$≥2; and $$S1 \geq 0, S2 \geq 0, M \geq S1 + \sum_{j=1}^{S2} R_j > 0,$$

$$\text{and} \left(M - S1 - \sum_{j=1}^{S2} R_j\right) + \sum_{i=1}^{S1} P1_i + \sum_{j=1}^{S2} P2_j = N.$$

2. The signal transmission method according to claim 1, wherein N is an integral multiple of M, S1=M, P1$_i$=N/S1, and S2=0.

3. The signal transmission method according to claim 1, wherein P1$_i$ virtual sectors are created using physical sector i that comprises H1$_i$ antennas by:

performing common pilot weighting on H1$_i$ antennas in physical sector i that comprises H1$_i$ antennas to form P1$_i$ beams pointing at different directions, thereby forming P1$_i$ virtual sectors.

4. The signal transmission method according to claim 1, wherein P2$_j$ virtual sectors are created using group j of virtual sectors that comprises H2$_j$ antennas by:

performing common pilot weighting on H2$_j$ antennas in a physical sector that corresponds to group j of virtual sectors that comprises H2$_j$ antennas to form P2$_j$ beams pointing at different directions, thereby forming P2$_j$ virtual sectors.

5. The signal transmission method according to claim 3, wherein common pilot weighting is performed on H1$_i$ antennas in physical sector i that comprises H1$_i$ antennas by:

classifying H1$_i$ antennas in the physical sector that comprises H1$_i$ antennas into at least one group, wherein each group comprises at least two antennas; and weighting each antenna in each group among the at least one group by using P1$_i$ sets of weights to form P1$_i$ beams, wherein the number of weights comprised in each set of weights equals the number of antennas in each group.

6. The signal transmission method according to claim 4, wherein common pilot weighting is performed on H2$_j$ antennas in the physical sector that corresponds to group j of virtual sectors that comprises H2$_j$ antennas by:

classifying H2$_j$ antennas in a physical sector that corresponds to virtual sectors and comprises H2$_j$ antennas into at least one group, wherein each group comprises at least two antennas; and weighting each antenna in each group among the at least one group by using P2$_j$ sets of weights to form P2$_j$ beams, wherein the number of weights comprised in each set of weights equals the number of antennas in each group.

7. The signal transmission method according to claim 1, wherein uplink signals are received through the M sectors by:

scheduling user equipments corresponding to each sector among the M sectors to receive uplink signals through the M sectors.

8. The signal transmission method according to claim 1, further comprising:

reducing the number of the N sectors used to send downlink signals.

9. The signal transmission method according to claim 8, wherein the number of the N sectors is reduced by:

reducing the number of P1$_i$ created virtual sectors, and/or reducing the number of P2$_j$ created virtual sectors to reduce the number of the N sectors.

10. A signal transmission apparatus, comprising:

a creation module, configured to create N sectors by using M sectors used to receive uplink signals, wherein N>M; and a sending module, configured to send uplink signals through the N sectors;

wherein the creation module comprises:

a first creation module, configured to create P1$_i$ virtual sectors by using each physical sector among S1 physical sectors that comprises H1$_i$ antennas, wherein S1 physical sectors are in the M sectors, and i indicates a serial number of a sector among the S1 sectors, i∈[1,S1], P1$_i$≥2, and H1$_i$≥2; and a second creation module, configured to create P2$_j$ virtual sectors by using each group of virtual sectors among S2 groups of virtual sectors in the M sectors, wherein each group of virtual sectors comprises H2$_j$ antennas and R$_j$ virtual sectors, R$_j$ virtual sectors in each group of virtual sectors correspond to the same physical sector, j indicates a serial number of a group of sectors among the S2 groups of sectors, j∈[1,S2], P2$_j$≥R$_j$, and H2$_j$≥2; and $$S1 \geq 0, S2 \geq 0, M \geq S1 + \sum_{j=1}^{S2} R_j > 0,$$

$$\text{and} \left(M - S1 - \sum_{j=1}^{S2} R_j\right) + \sum_{i=1}^{S1} P1_i + \sum_{j=1}^{S2} P2_j = N.$$

11. The signal transmission apparatus according to claim 10, wherein:

the first creation module is configured to perform common pilot weighting on H1$_i$ antennas in physical sector i that comprises H1$_i$ antennas to form P1$_i$ beams pointing at different directions, thereby forming P1$_i$ virtual sectors.

12. The signal transmission apparatus according to claim 10, wherein:

the second creation module is configured to perform common pilot weighting on H2$_j$ antennas in a physical sector that corresponds to group j of virtual sectors that comprises H2$_j$ antennas to form P2$_j$ beams pointing at different directions, thereby forming P2$_j$ virtual sectors.

13. The signal transmission apparatus according to claim 11, wherein the first creation module comprises:

a first grouping submodule, configured to classify H1$_i$ antennas in a physical sector that comprises H1$_i$ antennas into at least one group, wherein each group comprises at least two antennas; and a first weighting submodule, configured to weight each antenna in each group among the at least one group by using P1$_i$ sets of weights to form P1$_i$ beams, wherein the number of weights comprised in each set of weights equals the number of antennas in each group.

14. The signal transmission apparatus according to claim 12, wherein the second creation module comprises:

a second grouping submodule, configured to classify H2$_j$ antennas in a physical sector that corresponds to virtual sectors and comprises $H2_j$ antennas into at least one group, wherein each group comprises at least two antennas; and a second weighting submodule, configured to weight each antenna in each group among the at least one group by using $P2_j$ sets of weights to form $P2_j$ beams, wherein the number of weights comprised in each set of weights equals the number of antennas in each group.

15. The signal transmission apparatus according to claim 10, further comprising:

a scheduling module, configured to schedule user equipments corresponding to each sector among the M sectors to receive uplink signals through the M sectors.

16. The signal transmission apparatus according to claim 10, further comprising:

a regression module, configured to reduce the number of N sectors used to send downlink signals.

17. The signal transmission apparatus according to claim 16, wherein the regression module comprises:

a first reduction module, configured to reduce the number of $P1_i$ created virtual sectors; and/or a second reduction module, configured to reduce the number of $P2_j$ created virtual sectors.

18. A base station, comprising:

a signal transmission apparatus, configured to:
create N sectors by using M sectors used to receive uplink signals, wherein N>M; and
send uplink signals through the N sectors;

wherein the N sectors are created in at least one of the following manners by using the M sectors used to receive uplink signals:

creating $P1_i$ virtual sectors by using each physical sector among S1 physical sectors that comprises $H1_i$ antennas, wherein S1 physical sectors are in the M sectors and i indicates a serial number of a sector among the S1 sectors, $i \in [1, S1]$, $P1_i \geq 2$, and $H1_i \geq 2$; and creating $P2_j$ virtual sectors by using each group of virtual sectors among S2 groups of virtual sectors in the M sectors, wherein each group of virtual sectors comprises $H2_j$ antennas and $R_j$ virtual sectors, $R_j$ virtual sectors in each group of virtual sectors correspond to the same physical sector, j indicates a serial number of a group of sectors among the S2 groups of sectors, $j \in [1, S2]$, $P2_j > R_j$, and $H2_j \geq 2$; and $$S1 \geq 0,\ S2 \geq 0,\ M \geq S1 + \sum_{j=1}^{S2} R_j > 0,$$

$$\text{and } \left(M - S1 - \sum_{j=1}^{S2} R_j\right) + \sum_{i=1}^{S1} P1_i + \sum_{j=1}^{S2} P2_j = N.$$

* * * * *

UNITED STATES PATENT AND TRADEMARK OFFICE
CERTIFICATE OF CORRECTION

PATENT NO. : 8,855,718 B2  
APPLICATION NO. : 13/745183  
DATED : October 7, 2014  
INVENTOR(S) : Cai et al.

Page 1 of 1

It is certified that error appears in the above-identified patent and that said Letters Patent is hereby corrected as shown below:

Title page, item 71

*Under the Applicant:*

Huawei Technologies Co., Ltd., Guangdong (CN)

should read

Huawei Technologies Co., Ltd., Shenzhen (CN)

Signed and Sealed this  
Twenty-sixth Day of May, 2015

Michelle K. Lee  
*Director of the United States Patent and Trademark Office*